United States Patent [19]

Hirakui et al.

[11] Patent Number: 4,820,093

[45] Date of Patent: Apr. 11, 1989

[54] RETRACTABLE ROPE HOOK ARRANGEMENT FOR VEHICLE

[75] Inventors: Hidemasa Hirakui, Yokohama; Masayoshi Kishima, Atsugi, both of Japan

[73] Assignees: Nissan Motor Co., Ltd.; Ohi Seisa Kusho Co., Ltd., both of Japan

[21] Appl. No.: 762,862

[22] Filed: Aug. 6, 1985

[30] Foreign Application Priority Data

Aug. 7, 1984 [JP] Japan .................. 59-164274

[51] Int. Cl.4 ............................................. B60P 7/08
[52] U.S. Cl. .................................... 410/107; 410/111
[58] Field of Search ..................... 410/10, 11, 23, 52, 410/55, 85, 96, 101, 102, 106-108, 110, 111, 116; 403/322, 325, 330; 248/509; 292/127, DIG. 4, DIG. 37

[56] References Cited

U.S. PATENT DOCUMENTS

| 2,729,417 | 1/1956 | Maynard | 410/111 |
| 2,729,418 | 1/1956 | Maynard | 410/102 |
| 3,102,708 | 9/1963 | Crain | 410/107 |
| 3,618,884 | 11/1971 | Wilson | 248/509 |
| 4,331,355 | 5/1982 | Okuno | 292/DIG. 4 X |

FOREIGN PATENT DOCUMENTS

| 164649 | 10/1953 | Australia | 410/111 |
| 53-84820 | 7/1978 | Japan . | |
| 55-136639 | 9/1980 | Japan . | |

Primary Examiner—Robert B. Reeves
Assistant Examiner—Frank Williams
Attorney, Agent, or Firm—Leydig, Voit & Mayer

[57] ABSTRACT

A rope hook arrangement for a vehicle has a case fixed to a vehicle body, and a movable member slidable rectilinearly in the case so that a rope hook fixed to the movable member can be projected from the vehicle body and retracted. A spring is disposed between the case and movable member for urging the movable member to a projected position. A push-lock-push-release mechanism is provided for holding the movable member in a middle position in which the rope hook is retracted, allowing the movable member to move to the projected position when the movable member is depressed from the middle position to a depressed position and unhanded at the depressed position, and allowing the movable member to return to the middle position when the movable member is depressed from the projected position to the depressed position and unhanded. The push-lock-push-release mechanism comprises a rotatable member mounted on the case, and engaging and actuating projections formed in the movable member. The rotatable member is rectangular, and has two longer sides which are flat and parallel, and two shorter sides which are notched. The actuating projection abuts on the rotatable member when the movable member is moved to the depressed position, and rotates the rotatable member from a lock position to a release position or vice versa. The engaging projection engages with one of the notched shorter sides of the rotatable member and holds the movable member in the middle position only when the rotatable member is in the lock position.

7 Claims, 4 Drawing Sheets

RETRACTABLE ROPE HOOK ARRANGEMENT FOR VEHICLE

BACKGROUND OF THE INVENTION

The present invention relates to a rope hook for catching, dragging or fastening ropes. Rope hooks are widely used in trucks and other vehicles for tying goods and equipments.

Japanese Utility Model Application, provisional publication No. 53-84820 discloses one conventional example. In this example, downwardly bent rope hooks are fixed to both sides of a floor board, or a top of each side board, of a load carring platform of a truck. Therefore, the rope hooks always project outwardly. The rope hooks of this example are undesirable in that they tend to catch clothes of persons working or walking nearby, that they tend to strike against pedestrians or other objects when the vehicle is moving, and that they injure the appearance of the vehicle.

Another conventional example is shown in Japanese Utility Model Application, provisional publication No. 55-136639. In this example, rope hooks are concealed in a groove formed in each side board on the inboard side when they are not used. According to the need, each rope hook is rotated to a position in which the rope hook is projected, and received in a notch formed in the side board on the outer side. However, the rope hooks of this type are not satisfactory in that the outwardly facing notches injure the appearance of the vehicle, that operations for projecting and retracting the rope hooks are troublesome, and that it is difficult to rotate the rope hooks to the projected position after loading.

SUMMARY OF THE INVENTION

It is an object of the present invention to provide a rope hook arrangement whose rope hook can be projected and rectracted by very simple operations and which is simple in construction, small in size, and easy to manufacture.

Accordingly to the present invention, a rope hook arrangement for a vehicle, comprises housing means adapted to be fixed to a body of the vehicle, and a movable member mounted on the housing means. The movable member is movable relative to the housing means along a straight line in outward and inward directions between a projected position and a depressed position. The movable member has a rope hook having an outwardly facing outward face. The rope hook is projected outwardly from a predetermined reference surface stationary relative to the housing means when the movable member is in the projected position, and depressed inwardly below the predetermined reference surface when the movable member is in the depressed position. The rope hook arrangement further comprises biasing means disposed between the housing means and the movable member for urging the movable member outwardly to the projected position, and latching means for selectively allowing the movable member to move into the projected position and maintaining the movable member in a middle position lying between the projected and depressed positions. The outward face of the rope hook lies on the reference surface when the movable member is in the middle position. The latching means comprises fixed means and a rotatable member one of which is mounted on the housing means and the other of which is mounted on the movable member. The fixed means is fixedly mounted, and the rotatable member is mounted so that the rotatable member is rotatable about a rotation axis. The fixed means comprises an engaging projection and an actuating projection. The rotatable member has a plurality of first side surfaces and second side surfaces which are arranged alternately around the rotation axis. The rotatable member occupies a lock position and a release position alternately when the rotatable member rotates in one direction. The engaging projection prevents the movable member from moving from the middle position to the projected position by engaging with one of the first side surfaces of the rotatable member when the rotatable member is in the lock position, and allows the movable member to move from the middle position to the projected position when the rotatable member is in the release position. The actuating projection causes the rotatable member to rotate from the lock position to the release position when the movable member is moved to the depressed position with the rotatable member in the lock position and to rotate from the release position to the lock position when the movable member is moved from the projected position to the depressed position with the rotatable member in the release position.

DETAILED DESCRIPTION OF THE INVENTION

One embodiment of the present invention is shown in FIGS. 1-8.

Figure 5:
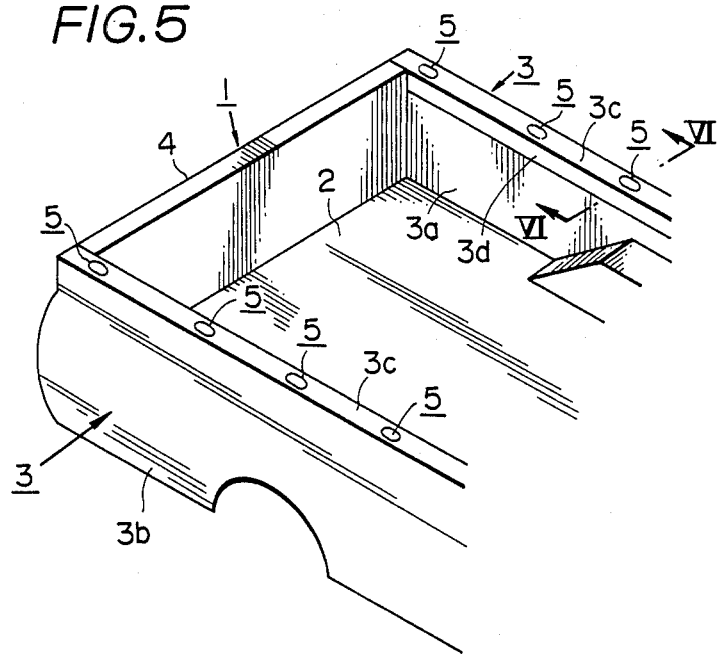
FIG. 5 is a schematic perspective view of a rear body of a truck having the rope hook arrangements of the present invention.

As shown in FIG. 5, a rear body 1 of a small-sized truck has a floor board 2, right and left upright fixed side boards 3, and a hinged tail board 4.

Each of the side boards 3 has a substantially vertical inner panel 3a and an outer panel 3e having an outer portion 3b, a top portion 3c and an inner portion 3d. The outer portion 3b is substantially vertical, fixed to the outboard side of the inner panel 3a at a joint near the top end of the inner panel 3a, and so curved as to form an outside contour of the side board 3. The top portion 3c is substantially horizontal and forms a top surface of the side board 3. The inner portion 3d extends downwardly from the inboard end of the top portion 3c.

A plurality of rope hook arrangements 5 are arranged in each side board 3 at appropriate intervals in a longitudinal line of the side board 3 in parallel to the longitudinal line of the truck.

Figure 6:
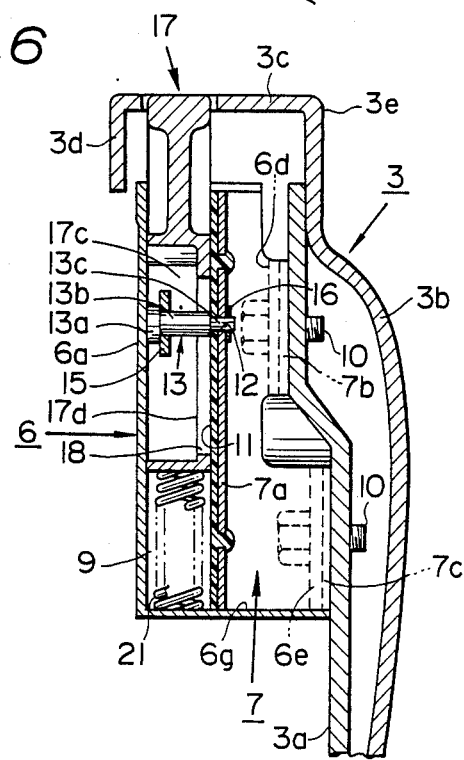
FIG. 6 is an enlarged vertical sectional front elevation taken across a line VI—VI of FIG. 5.
Figure 7:
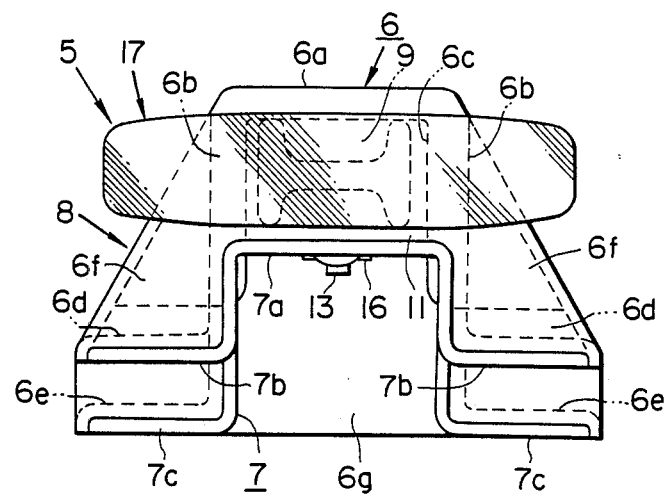
FIG. 7 is an enlarged plan view of the rope hook arrangement of FIG. 6.
Figure 8:
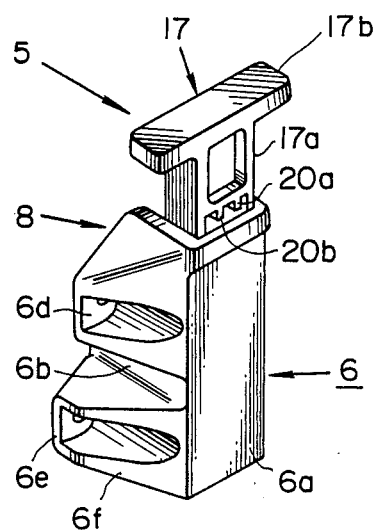
FIG. 8 is a perspective view of the rope hook arrangement of FIG. 7.

As shown in FIG. 8, each rope hook arrangement 5 has a stationary case 8 fixed to the truck body and a movable member 17 which is slidable in the case 8 and has a rope hook 17b. Each rope hook arrangement 5 is constructed as follows:

As shown in FIGS. 6 and 7, the stationary case 8 is formed by a base 6 and a cover 7. The base 6 has a center portion 6a, and front and rear portions 6b which form a substantially rectangular groove 6c. That is, the base 6 is in a shape of a channel having a U-shaped cross section. The groove 6c extends vertically. The base 6 further has a pair of upper flanges 6d and a pair of lower flanges 6e. Two flanges of each pair extend from edges of front and rear portions 6b, respectively, in the opposite directions, substantially in parallel to the center portion 6a. A plane in which the upper flanges 6d extend is closer to the center portion 6a than a plane in which the lower flanges 6e extend. An angle between each of the flanges 6d and 6e and the front and rear portion 6b is reinforced by a rib 6f. The base 6 further has a bottom plate 6g.

The cover 7 has a channel portion 7a having a substantially rectangular groove extending vertically. The groove of the cover 7 is shallower than the groove 6c of the base 6. Like the base 6, the cover 7 further has a pair of upper flanges 7b and a pair of lower flanges 7c. Two flanges of each pair 7b or 7c extend from opposite borders of the channel portion 7a, respectively, in the opposite directions, substantially in parallel to the bottom of the groove of the channel portion 7a. A plane in which the upper flanges 7b extend is closer to the bottom of the groove than a plane in which the lower flanges 7c extend.

The case 8 is formed by inserting the channel portion 7a of the cover 7 into the groove 6c of the base 6, and putting each of the flanges 7b and 7c of the cover 7 on a corresponding one of the flanges 6d and 6e of the base 6. Therefore, the case 8 is formed with a chamber 9 having a rectangular horizontal cross secional shape having two longer parallel sides defined by the center portion 6a of the base 6 and the bottom of the channel portion 7a of the cover 7, and two shorter parallel sides defined by the front and rear portions 6b of the base 6. The chamber 9 extends vertically and has an open top end. The case 8 is fixed to the inner panel 3a of the side board 3 by bolts 10 each of which passes through one of the overlapped flange pairs 6d and 7b or 6e and 7c.

Inside the chamber 9, a slide plate 11 of synthetic resin is fixed to the channel portion 7a of the cover 7. The case 8 is formed with a hole 12 which extends horizontally and passes through the slide plate 11 and the channel portion 7a. The hole 12 is located in the middle between the front and rear portions 6b within an upper half of the chamber 9.

A horizontal shaft 13 is fixedly mounted on the case 8, and extends within the chamber 9 horizontally from the center portion 6a of the base 6 to the slide plate 11. The shaft 13 has a base portion 13a fixed to the center portion 6a of the base 6, an end portion 13c inserted through the hole 12, and a middle portion 13b extending between the base portion 13a and the end portion 13c. The middle and end portions 13b and 13c are cylindrical. The diameter of the end portion 13c is smaller than that of the middle portion 13b. The end portion 13c is inserted from the inside of the chamber 9 and projects outwardly. A washer 16 having a claw is attached to the projected end of the end portion 13c.

A latching means or a push-lock-push-release mechanism 14 comprises a rotatable member 15 rotatably mounted on the middle portion 13b of the shaft 13. The rotatable member 15 is made from a plate of a rectangular shape having two parallel longer side surfaces 15b and two parallel shorter side surfaces. The shorter side surfaces are formed, respectively, with V-shaped notches 15a which are symmetrical with respect to the center of the rectangular shape. The longer side surfaces 15b are flat.

The movable member 17 has a main portion 17a having a horizontal cross section of a rectangular shape and extending vertically, and a rope hook 17b extending upwardly from the top of the main portion 17a. A lower part of the main portion 17a is formed with a rectangular box 17c of a rectangular parallelepiped having upper and lower horizontal faces, front and rear vertical faces, an outboard vertical face 17d, and an inboard vertical face which is fully open. The outboard face 17d of the box 17c is formed with a vertically elongated slot 18. The middle portion 13b of the horizontal shaft 13 passes through the slot 18. The main portion 17a of the movable member 17 is slidable between the center portion 6a of the base 6 and the slide plate 11.

Figure 1:
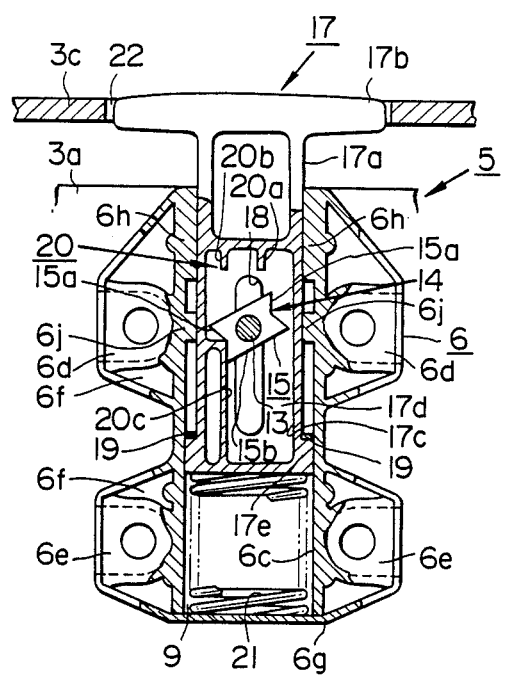
FIG. 1 is a partially cutaway vertical sectional elevation side of a rope hook arrangement for showing one embodiment of the present invention.

As shown in FIG. 1, two rectangular projections 6h project, respectively, from the front and rear portions 6b of the base 6, inwardly toward a vertical center line of the chamber 9. Two stoppers 6j project, respectively, from the front and rear portions 6b of the base 6, inwardly toward the vertical center line of the chamber 9. The projections 6h are located near the top end of the chamber 9, and the stopper 6j are located below the projections 6h. The main portion 17a of the movable member 17 is slidable vertically between the projections 6h and between the stoppers 6j. The bottom end of the main portion 17a of the movable member 17 is formed with two projections 17e one of which projects forwardly, and the other of which projects rearwardly. The stoppers 6j limit an upward movement of the movable member 17 by engaging with the projections 17e, respectively. A cushion 19 of elastic material such as rubber is attached to an upper surface of each projection 17e.

A primary actuating projection 20a and a secondary actuating projection 20b project downwardly from the upper face of the box 17c. The primary projection 20a is closer to the front face of the box 17c. An engaging projection 20c capable of engaging with the rotatable member 15 is formed in the rear face of the box 17c. The primary and secondary projections 20a and 20b and the engaging projection 20c constitute a fixed means 20 which forms the latching means 14 with the rotatable member 15.

A biasing means such as a coil spring 21 is disposed under compression between the movable member 17 and the base 6 of the stationary case 8. The spring 21 always urges the movable member 17 upwardly.

The movable member 17 has a projected position, a depressed position and a middle position intermediate between the projected and depressed position. In the middle position shown in FIG. 1, the rope hook 17b is received in an elongated opening 22 formed in the top portion 3c of the outer panel 3e of the side board 3, and a top surface of the rope hook 17b is even with or slightly depressed below an upper side of the top portion 3c. In the projected position shown in FIG. 3, the rope hook 17b projects upwardly from the top portion 3c. In the depressed position shown in FIGS. 2 and 4, the rope hook 17b is depressed beyond the middle position, and the primary actuating projection 20a abuts on the rotatable member 15.

Each rope hook arrangement 5 is operated as follows:

When the movable member 17 is in the middle position shown in FIG. 1, the engaging projection 20c of the movable member 17 engages with either of the V-shaped notches 15a of the rotatable member 15 which assumes an inclined position. Therefore, the movable member 17 cannot move upwardly toward the projected position, but is held in the middle position against the biasing force of the spring 21.

Figure 2:
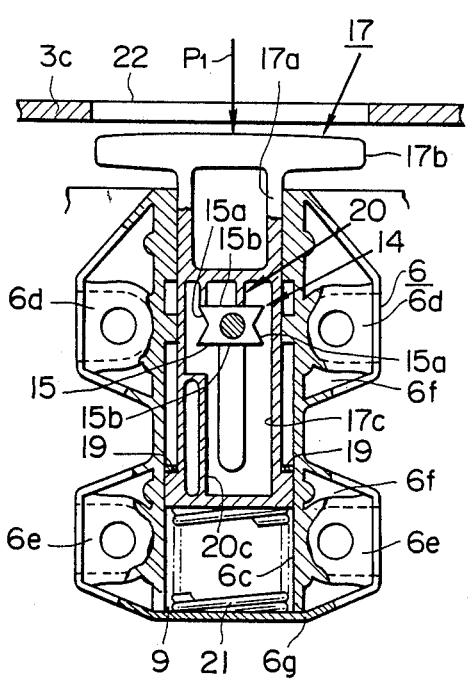
FIGS. 2-4 are vertical sectional side elevations similar to FIG. 1, for showing various states of the rope hook arrangement of FIG. 1.
Figure 3:
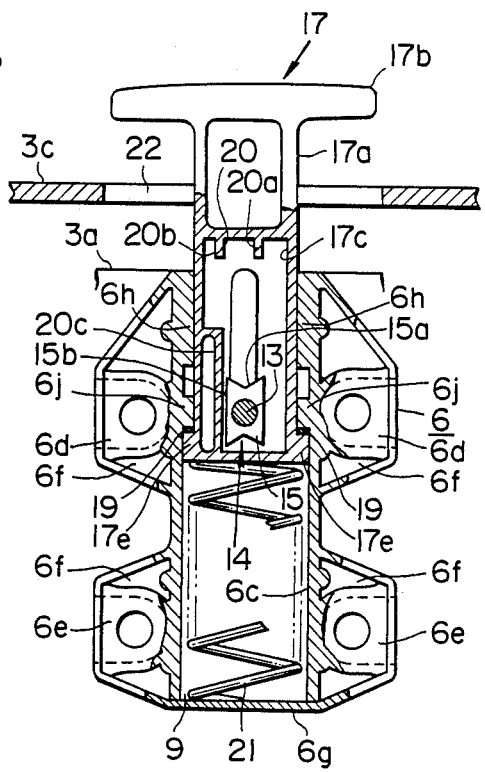

If the movable member 17 is moved downwardly toward the depressed position by pushing the rope hook 17b by hand as shown by an arrow $P_1$ in FIG. 2 against the force of the spring 21, the engaging projection 20c of the movable member 17 moves downwardly away from the rotatable member 15. Instead, the primary and secondary projections 20a and 20b of the movable member 17 come into contact with one of the longer side surfaces 15b of the rotatable member 15 and cause the rotatable member 15 to rotate from the inclined position to a perpendicular position in which the longer side surfaces 15b are perpendicular to a line along which the movable member 17 can move. That is, the longer side surfaces 15b are horizontal in the perpendicular position. The rotatable member 15 in the perpendicular position prevents a further downward movement of the movable member 17 from the depressed position.

If the movable member 17 is released in the depressed position by unhanding the rope hook 17b, the movable member 17 moves upwardly by the force of the spring 21. In this upward movement of the movable member 17, the engaging projection 20c abuts on one of the longer side surfaces 15b of the rotatable member 15 in the perpendicular position, and rotates the rotatable member 15 in the clockwise direction in the figure from the perpendicular position to a parallel position in which the longer side surfaces 15b are vertical. Therefore, the engaging projection 20c passes by the rotatable member 15 in the parallel position, and allows the movable member 17 to move to the projected position shown in FIG. 3. In the projected position, the projections 17e of the movable member 17 prevent a further upward movement of the movable member 17 by abutting against the stoppers 6j of the case 8 through the cushions 19, respectively, and the rope hook 17b is ready for receiving a rope.

Figure 4:
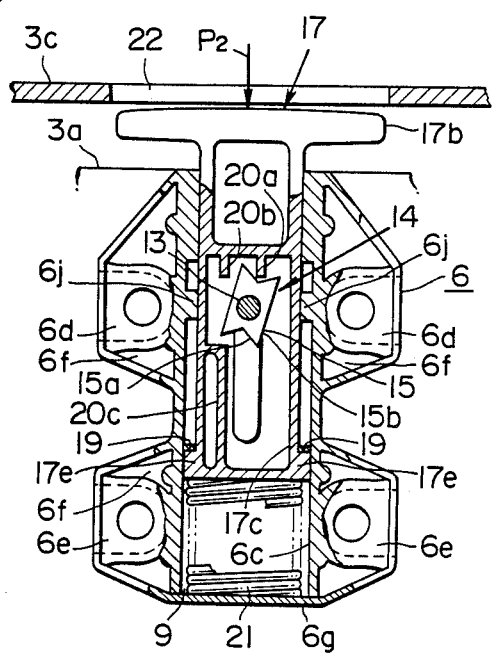

If, after use of the rope hook 17b, the movable member 17 is moved downwardly from the projected position to the depressed position by pushing the rope hook 17b against the force of the spring 21 as shown by an arrow $P_2$ in FIG. 4, then the primary actuating projection 20a engages with one of the V-shaped notches 15a of the rotatable member 15 in the parallel position, rotates the rotatable member 15 from the parallel position to the inclined position, and prevents a further downward movement of the movable member 17.

If the movable member 17 is released in the depressed position shown in FIG. 4 by unhanding the rope hook 17b, the movable member 17 moves upwardly by the force of the spring 21. In this case, the rotatable member 15 is in the inclined position in which one of the V-shaped notches 15a faces downwardly toward the engaging projection 20c. Therefore, the engaging projection 20c engages with one of the notches 15a and holds the movable member 17 in the middle position shown in FIG. 1 by preventing the movable member 17 from moving toward the projected position.

In this way, the rope hook of the present invention can be projected and retracted repeatedly by very simple operations. The push-lock-push-release mechanism or latching means of the present invention has a very simple construction comprising the rotatable member and the projections. Besides, the latching means is received in the box of the movable member, so that the size of the rope hook arrangement can be reduced.

The rope hook arrangement of the present invention can be installed in various manners. For example, the arrangement can be laid down so that the rope hook projects horizontally, or turned upside down. The rope hook arrangement of the present invention can be disposed in the floor board or the tail board of a truck. The rope hook may be in the shape of the letter L instead of the shape of the letter T.

What is claimed is:

1. A rope hook arrangement for a vehicle, comprising housing means adapted to be fixed to a body of the vehicle, a movable member mounted on the housing means, the movable member being movable relative to the housing means along a straight line in outward and inward directions between a projected position and a depressed position, the movable member having a rope hook having an outwardly facing outward face, the rope hook being projected outwardly from a predetermined reference surface stationary relative to the housing means when the movable member is in the projected position, and depressed inwardly below the predetermined reference surface when the movable member is in the depressed position, biasing means disposed between the housing means and the movable member for urging the movable member outwardly to the projected position, latching means for selectively allowing the movable member to move into the projected position and maintaining the movable member in a middle position lying between the projected and depressed positions, the outward face of the rope hook lying on the reference surface when the movable member is in the middle position, the latching means comprising fixed means and a rotatable member one of which is mounted on the housing means and the other of which is mounted on the movable member, the fixed means being fixedly mounted, and the rotatable member being mounted so that the rotatable member is rotatable about a rotation axis, the fixed means comprising an engaging projection and an actuating projection, the rotatable member having a plurality of first side surfaces and second side surfaces which are arranged alternately around the rotation axis, the rotatable member occupying a lock position and a release position alternately when the rotatable member rotates in one direction, the engaging projection preventing the movable member from moving from the middle position to the projected position by engaging with one of the first side surfaces of the rotatable member when the rotatable member is in the lock position, and allowing the movable member to move from the middle position to the projected position when the rotatable member is in the release position, the actuating projection causing the rotatable member to rotate from the lock position to the release position when the movable member is moved to the depressed position with the rotatable member in the lock position and to rotate from the release position to the lock position when the movable member is moved from the projected position to the depressed position with the rotatable member in the release position.

2. A rope hook arrangement according to claim 1, wherein the rotational axis of the rotatable member is substantial perpendicular to the straight line, and wherein the rotatable member is rectangular in cross section perpendicular to the rotation axis, the second side surfaces being two in number and flat and arranged to form longer sides of the rectangular cross sectional shape of the rotatable member, the first side surfaces being two in number and arranged to form shorter sides of the rectangular cross sectional shape, each of the first side surfaces having a notch capable of engaging with the engaging projection.

3. A rope hook arrangement according to claim 2, wherein the fixed means is mounted on the movable member, and the rotatable member is mounted on the housing means.

4. A rope hook arrangement according to claim 3, wherein the release position comprising a perpendicular position in which the second side surfaces are substantially perpendicular to the straight line and a parallel position in which the second side surfaces are substantially parallel to the straight line and the rotatable member is unable to engage with the engaging projection, the second side surfaces being inclined with respect to the straight line in the lock position, the actuating projection causing the rotatable member to rotate from the lock position to the perpendicular position by engaging with one of the second side surfaces or from the parallel position to the lock position by engaging with one of the first side surfaces when the movable member is depressed to the depressed position, the engaging projection allowing the movable member to move from the middle position to the projected position by rotating the rotatable member from the perpendicular position to the parallel position.

5. A rope hook arrangement according to claim 4, wherein the engaging projection and the actuating projection are separated on one side and the other side by a plane passing through the rotation axis in parallel to the straight line, and wherein the fixed means further comprises a secondary projection projecting in parallel to the actuating projection on the opposite side of the plane and assisting the actuating projection in bringing the rotatable member to the perpendicular position.

6. A rope hook arrangement according to claim 5, wherein the movable member has a box portion of a shape of a rectangular parallelepiped for receiving the rotatable member, the box portion having a rectangular outer face perpendicular to the straight line and a rectangular inner face which is located inwardly of the outer face in parallel to the outer face, the box portion further having four lateral faces perpendicular to the outer and inner faces, one of the lateral faces being formed with a slot elongated along the straight line for receiving the rotation axis of the rotatable member, the engaging projection being formed in one of the lateral faces perpendicular to the lateral face having the slot, the actuating projection and the secondary projection being formed in the outer face.

7. A rope hook arrangement according to claim 6, wherein the case is formed with at least one stopper which limits an outward movement of the movable member by engaging with a step formed in the movable member.

* * * * *